Patented May 3, 1949

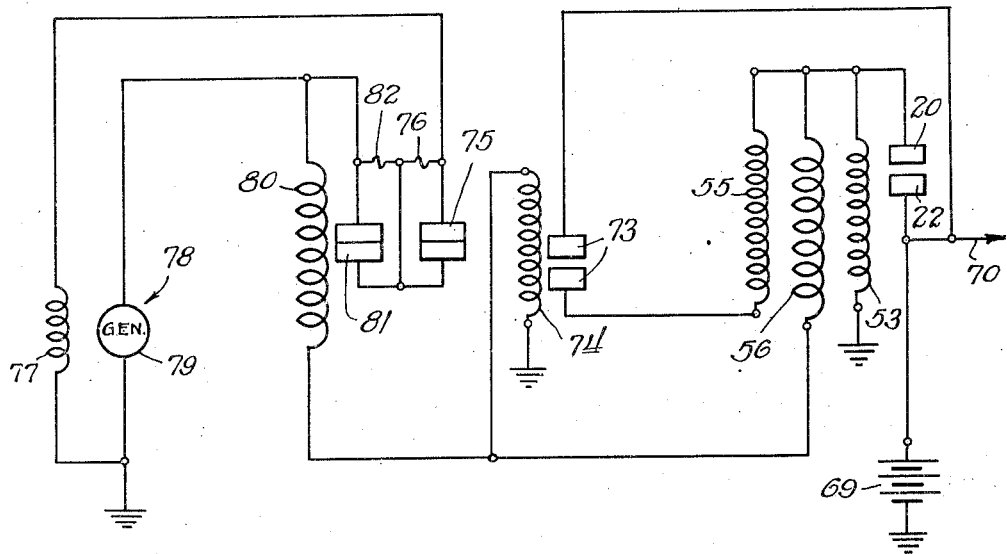

2,469,092

UNITED STATES PATENT OFFICE 2,469,092

CUTOUT RELAY SYSTEM

George L. Webb, Logansport, Ind., assignor to R-B-M Manufacturing Company, Logansport, Ind., a corporation of Indiana Original application November 24, 1944, Serial No. 564,942. Divided and this application September 20, 1946, Serial No. 698,351

1 Claim. (Cl. 320—33)

This invention relates to cutout relay systems for battery charging circuits, and is directed to the provision of relays suitable for use with chargers on airplanes and other vehicles subject to severe shocks in use, while also being suitable for use with stationary chargers and in conjunction with more than one variable speed generator for charging a common storage battery. This application is a division of application Serial No. 564,942, filed November 24, 1944, now Patent No. 2,412,792.

With a view to causing the main contacts of a cutout or reverse current relay in a battery charging system to close when the generator and battery voltages are about the same, there is provided a differential coil in the relay in addition to the conventional shunt and series coils. The differential coil is arranged to cooperate with the shunt and series coils in controlling the position of the main contacts. It is connected in shunt of the main contacts to be responsive to the difference in potential between the battery and generator voltages and to the direction of said difference to assist the shunt coil in closing the main contacts when the generator voltage is higher than the battery voltage, and to oppose the shunt coil and thereby oppose closing of the main contacts when the battery voltage is the higher.

By arranging to close the main contacts of the relay when the battery and generator voltages are about equal, sparking of the contacts is reduced, particularly where two or more generators are used to charge a common battery. In such case a cutout relay as herein described is used for each generator.

Two generators may be connected in parallel to the battery through regulators and cutout relays employing differential coils. They can be operated over a limited voltage tolerence range without flutter of the circuit breaker points of the low set regulator. The instant the reverse current of the low set regulator exceeds its setting the circuit breaker will open. The differential winding in the circuit breaker then comes into play raising the closing voltage of the circuit breaker above the line voltage so that it cannot reclose until the line voltage becomes lower.

Fluttering and consequent sparking of the main contacts when they open on reverse current flow through the series coil is also reduced through the use of the differential coil. In such case the differential coil opposes the shunt coil since the battery voltage is higher than the generator voltage and permits substantially free action of the biasing means urging the contacts to open position.

A disadvantage of the foregoing arrangement is that the differential coil, being connected between the battery and the generator, provides a path over which the battery discharges through the armature of the generator when the latter is stopped or not generating a voltage opposing the battery voltage. It is to overcoming this disadvantage or difficulty that the present invention is particularly addressed.

An object of this invention is to prevent battery drain through the differential coil of a generator cutout or reverse current relay when the generator is not operating.

Another object of this invention is to control the energization and deenergization of the differential coil in accordance with the generator voltage.

Another object of this invention is to control the energization of the differential coil by a relay that, in turn, is energized in accordance with the generator voltage.

In the drawing, the single figure illustrates a preferred embodiment of this invention.

It will be noted in the drawing that a shunt coil 53, differential coil 55 and series coil 56 are used for controlling the operation of main contacts, a pair of which is shown at 20 and 22. If desired a latch coil and a latch operated thereby can be used for the purpose described in the copending application referred to hereinbefore.

In this embodiment of the invention, however, contacts 73 are provided for controlling the energization of the differential coil 55. The contacts 73 may be operated by a voltage regulating relay whose coil 74 is shunted across the charging generator. The coil 74 also controls contacts 75 arranged to shunt a resistor 76 connected in the circuit of the field coil 77 of the generator, shown generally at 78. The armature 79 of the generator 78 is connected through the coil 80 of a current regulating relay whose contacts 81 are arranged to shunt resistor 82 also connected in the circuit to the field coil 77. The arrangement is such that the contacts 73 will close at a predetermined voltage below that at which the contacts 75 open, but will not open at the reduced voltage caused by operation of the regulating relay contacts 81.

It will be apparent that the energization of the differential coil 55 will be controlled in the system shown in the drawing in accordance with the charging generator voltage, the object being to prevent drain of the battery 69 through the differential coil 55 when the generator 78 is stopped or not operating. The battery 69 may be arranged for charging by two or more generators with duplicate regulators and cutouts as specifically described in said copending application. Such a multiple system has very definite advantages over known circuits. The generator circuit breaker will close closer to line voltage on low line voltages. This is due to the action of the differential circuit breaker winding which aids the circuit breaker voltage winding causing the circuit breaker to close below its open circuit setting. The generator will always come on the line even though the circuit breaker open circuit setting is above the voltage regulator setting. This is again due to the action of the differential winding. No extra regulator terminals, contacts and external wiring are needed to obtain practical parallel operation. The regulator with the additional windings described above is interchangeable with present production regulators.

Since the differential coils are automatically deenergized upon dropping of the generator voltage, no drain through the battery occurs when the corresponding generator is not running. Usually one generator regulator will be set for a higher voltage than another. But even under those conditions the operation is without flutter and without battery drainage when each generator with its regulator and cutout is arranged as shown and described.

Since certain further changes can be made in the foregoing construction and different embodiments of the invention can be made without departing from the spirit and scope thereof, it is intended that all matter shown in the accompanying drawing or described hereinbefore shall be interpreted as illustrative and not in a limiting sense.

What is claimed as new is:

For combination with a battery and a variable speed generator for charging the same, a cutout relay comprising main contacts for connecting the battery to the generator, a shunt coil disposed to be connected for energization across the generator and to close said main contacts when the generator voltage reaches a predetermined value, a series coil disposed to be connected in series circuit relation with the generator to assist said shunt coil in holding said main contacts closed when current flows from the generator to the battery, a differential coil disposed to be connected to be responsive to the difference between the battery and generator voltages and to assist said shunt coil in closing said main contacts when the battery voltage is less than the generator voltage, and voltage regulating means for the generator including a coil disposed to be responsive to the generator voltage, contact means for controlling the voltage of said generator, and normally open auxiliary contacts disposed to be closed thereby when the generator voltage reaches a predetermined value, said auxiliary contacts being connected in series circuit relation with said differential coil for disconnecting it from the battery when the generator is not running to prevent drain on the battery during such time.

GEORGE L. WEBB.

REFERENCES CITED

The following references are of record in the file of this patent:

UNITED STATES PATENTS

| Number | Name | Date |
|---|---|---|
| 607,124 | Negbauer | July 12, 1898 |
| 707,763 | Creveling | Aug. 26, 1902 |
| 2,163,502 | Stewart | June 20, 1939 |
| 2,353,268 | Roberts | July 11, 1944 |
| 2,359,175 | Walley | Sept. 26, 1944 |